(12) United States Patent
Liu et al.

(10) Patent No.: US 10,682,756 B1
(45) Date of Patent: Jun. 16, 2020

(54) DRIVING ASSEMBLY AND ROBOTIC HAND HAVING THE SAME

(71) Applicant: UBTECH Robotics Corp, Shenzhen (CN)

(72) Inventors: Sicong Liu, Shenzhen (CN); Youjun Xiong, Shenzhen (CN); Hongyu Ding, Shenzhen (CN); Jianxin Pang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/370,890

(22) Filed: Mar. 30, 2019

(30) Foreign Application Priority Data

Dec. 29, 2018 (CN) .......................... 2018 1 1641612

(51) Int. Cl.
| | |
|---|---|
| *B25J 17/00* | (2006.01) |
| *B25J 17/02* | (2006.01) |
| *B25J 18/00* | (2006.01) |
| *B25J 9/10* | (2006.01) |
| *F16H 25/20* | (2006.01) |
| *F16C 1/16* | (2006.01) |

(52) U.S. Cl.
CPC ................. *B25J 9/104* (2013.01); *F16C 1/16* (2013.01); *F16H 25/20* (2013.01)

(58) Field of Classification Search
CPC ........ B25J 9/104; B25J 15/0009; F16H 19/06
See application file for complete search history.

(56) References Cited

U.S. PATENT DOCUMENTS

| | | | | |
|---|---|---|---|---|
| 2006/0131908 | A1* | 6/2006 | Tadano | B25J 15/0009 294/111 |
| 2007/0035143 | A1* | 2/2007 | Blackwell | B25J 15/0009 294/111 |
| 2007/0199399 | A1* | 8/2007 | Okazaki | B25J 9/104 74/490.05 |
| 2011/0163561 | A1* | 7/2011 | Kim | B25J 9/104 294/111 |
| 2014/0331798 | A1* | 11/2014 | Shim | F16H 19/08 74/89.22 |

\* cited by examiner

*Primary Examiner* — Jake Cook (57) ABSTRACT

A driving assembly of a robotic hand includes an actuator, a fixed member, an elastic member having an end connected to the actuator, two phalanxes rotatably connected to each other through a first revolute joint, one of which is rotatably connected to the fixed member through a second revolute joint, torsion springs mounted to the first revolute joint and the second revolute joint, a first pulling member having two opposite ends that are respectively fixed to the fixed member and the first revolute joint, a second pulling member having two opposite ends that are respectively fixed to the first revolute joint and the second revolute joint, and a third pulling member having two opposite ends that are respectively fixed to the actuator and the second one of the at least two phalanxes.

10 Claims, 10 Drawing Sheets

DRIVING ASSEMBLY AND ROBOTIC HAND HAVING THE SAME

CROSS REFERENCE TO RELATED APPLICATIONS

This application claims priority to Chinese Patent Application No. 201811641612.3, filed Dec. 29, 2018, which is hereby incorporated by reference herein as if set forth in its entirety.

BACKGROUND

1. Technical Field

The present disclosure generally relates to robots, and particularly to a driving assembly of a robotic hand and a robotic hand including the driving assembly.

2. Description of Related Art

Manipulable hand-like apparatuses are utilized in several industries. One such apparatus is a multi-fingered robotic hand of a humanoid robot. The multi-fingered robotic hand includes a plurality of fingers capable of performing certain grasping operations. A finer of the robotic hand includes two or more phalanxes. In some conventional robotic hands, each phalanx is driven by an actuator and one robotic hand then needs ten or more actuators. One problem with such configuration is that the robotic hands are bulky due to the actuators.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIGS. 1-8, in one embodiment, a driving assembly of a robotic hand includes an actuator 1, a fixed member 2, phalanxes, torsion springs 9, an elastic member 5, a first pulling member 6, a second pulling member 7, and a third pulling member 8. The first pulling member 6, the second pulling member 7 and the third pulling member 8 are made of flexible material, such as steel wire, Dyneema® cable, steel belt and the like. The actuator 1 outputs a linear motion to drive the first pulling member 6 to move. The fixed member 2 is fixed to a palm portion and serves as a part of a finger. The number of phalanxes is at least two. The at least two phalanxes are rotatably connected to each other through a revolute joint 012. A first one of the at least two phalanxes is rotatably connected to the fixed member 2 through a revolute joint 011. The elastic member 5 can be a spring. One end of the elastic member 5 is connected to the actuator 1, and the other end of the elastic member 5 is connected to the first pulling member 6.

In an alternative embodiment, a rope can also be arranged between the elastic member 5 and the actuator 1 to indirectly connect the elastic member 5 to the actuator 1. One end of the first pulling member 6 is fixed to the elastic member 5, and the other end is fixed to the revolute joint 011. The actuator 1 rotates the first one of the at least two phalanxes through the first pulling member 6. The second pulling member 7 has two ends fixed to the revolute joints 011 and 012, so as to pull a second one of the at least two phalanxes and rotate the second one of the at least two phalanxes with respect to the first one of the at least two phalanxes. The actuator 1 drives the first one of the at least two phalanxes to rotate through the first pulling member 6, and the second pulling member 7 pulls the second one of the at least two phalanxes to rotate during rotation of the first one of the at least two phalanxes. The torsion springs 9 are mounted to the revolute joint 011 and the revolute joint 012, and respectively apply a restoring force to the at least two phalanxes. Two legs of the torsion spring 9 on the revolute 011 are respectively abutted against or fixed to the fixed member 2 and the first one of the at least two phalanxes. Two legs of the torsion spring 9 on the revolute 012 are respectively abutted against or fixed to the revolute joints 011 and 012. The difference between the number of the phalanxes and the number of the third pulling member 8 is 1. The number of the third pulling member 8 and the second pulling member 7 are the same. The number of the phalanxes can be 2, 3, 4, etc. The number of the third pulling members 8 may be one, two, three, or the like. One end of each third pulling member 8 is fixed to the actuator 1, and the other end is fixed to a phalanx which is one phalanx spaced from the fixed member 2.

Figure 8A:
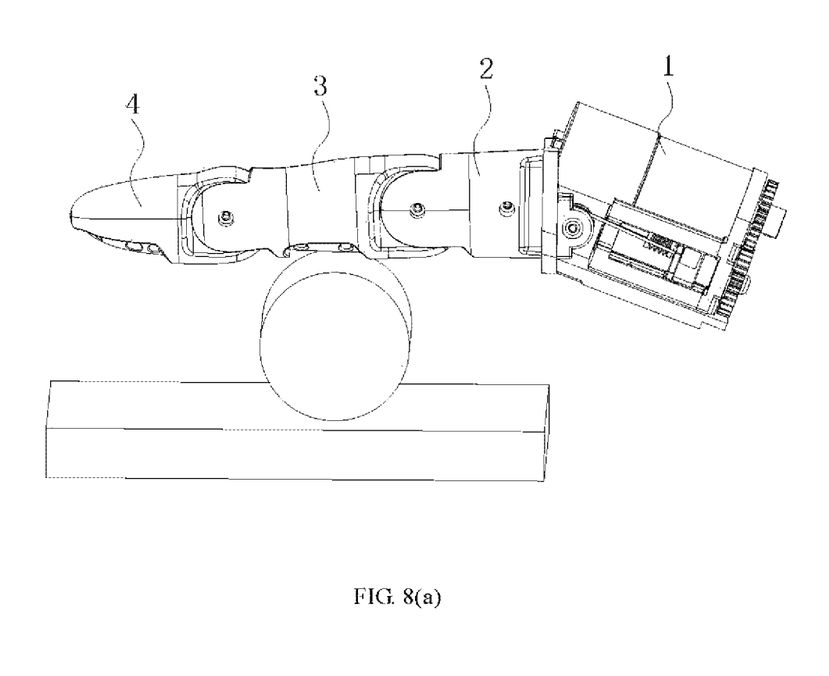
FIGS. 8(a) to 8(c) show different state of the driving assembly of FIG. 1 during attempt to grasp an object.
Figure 8B:
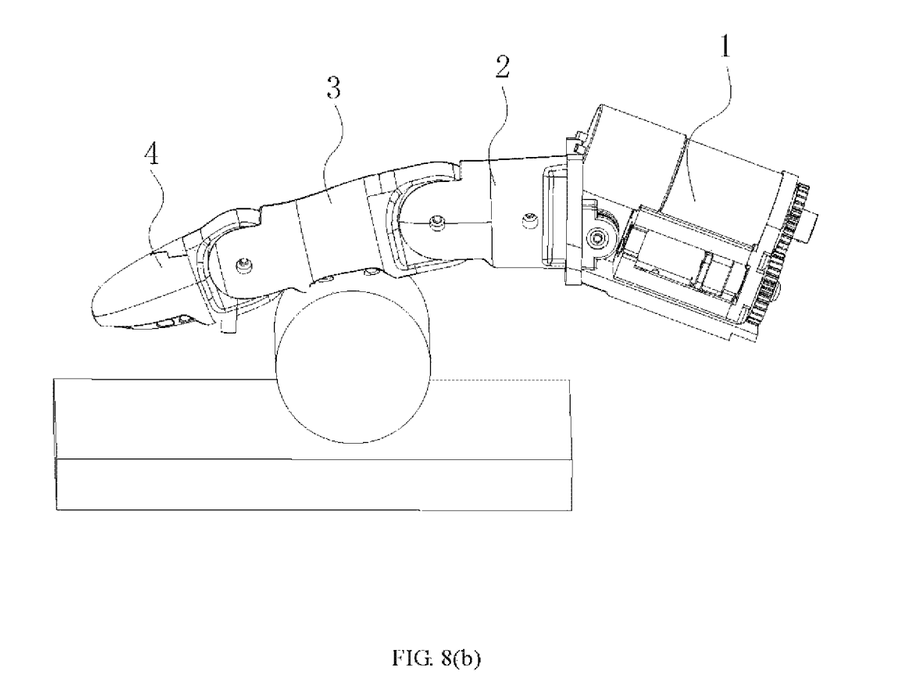
Figure 8C:
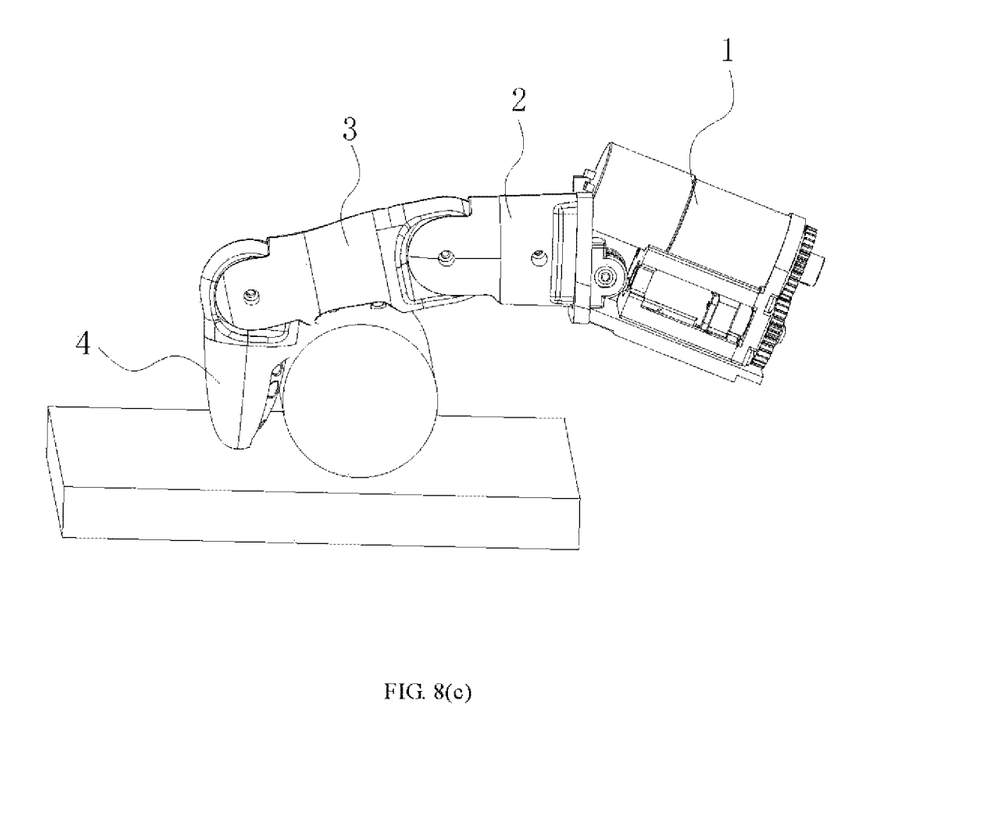

As shown in FIG. 8(a) to FIG. 8(c), when the actuator 1 operates, each of the phalanxes starts to rotate. When the middle phalanx bumps into the object to be grasped, the rotation of the middle phalanx is stopped. When the pulling force of the first pulling member 6 is greater than the deformation threshold of the elastic member 5, the elastic member 5 is stretched and elongated. The phalanx at the end is pulled by the third pulling member and continues to rotate until bumping into the object to be grasped, which achieves adaptive grasp.

With such configuration, the phalanxes are driven to rotate by using one actuator 70, which facilitates the compactness and reduction of weight and cost of the robotic hand. The torsion springs 9 facilitate smooth rotation of the phalanxes. When the middle phalanx bumps into the object to be grasped, the rotation of the middle phalanx is stopped. When the pulling force of the first pulling member 6 is greater than the deformation threshold of the elastic member 5, the elastic member 5 is stretched and elongated. The phalanx at the end is pulled by the third pulling member and continues to rotate until bumping into the object to be grasped, which achieves adaptive grasp.

Embodiment 1

Referring to FIGS. 2-5, the phalanxes include a first phalanx 3 and a second phalanx 4. The first phalanx 3 is rotatably connected to the fixed member 2, and the second phalanx 4 is rotatably connected to the first phalanx 3. The fixed member 2 includes a first shaft 21 at an end thereof. The first phalanx 3 includes at one end a first shaft receiver 31 to rotatably receive the first shaft 21 therein so as to form the revolute joint 011. The first phalanx 3 further includes a second shaft 33 at an opposite end thereof. The second phalanx 4 includes a second shaft receiver 41 to rotatably receive the second shaft 33 therein so as to form the revolute joint 012. The first shaft 21 is stationary and the first shaft receiver 31 is rotatable about the first shaft 21. The second shaft 33 and the second shaft receiver 41 are rotatable with respect to each other. The first pulling member 6 drives the first phalanx 3 to rotate, and the second pulling member 7 pulls the second phalanx 4 to rotate with respect to the first phalanx 3 during rotation of the first phalanx 3. Specifically, one end of the first pulling member 6 is fixed to the elastic member 5, and after passing through the fixed member 2 and the first phalanx 3 in sequence, the other end of the first pulling member 6 is fixed to the first shaft receiver 31, enabling the first pulling member 6 to pull the first phalanx 3 to rotate. The number of the second pulling member 7 is one, and is disposed inside the first phalanx 3. One end of the second pulling member 7 is fixed to the first shaft 21, and the other end is fixed to the second shaft receiver 41, enabling the second pulling member 7 to pull the second phalanx 4 to rotate when the first phalanx 3 rotates.

In one embodiment, the first shaft receiver 31 defines a through hole, and the first pulling member 6 passes through the through hole. The first pulling member 6 has a head at the end thereof that extends out of the through hole. The head abuts against the first shaft receiver 13, which fixed the first pulling member 6 to the first shaft receiver 31. In other embodiments, the first pulling member 6 may be wound around the first shaft receiver 31 and fixed in the first phalanx 3 by the head. The end of the second pulling member 7 adjacent to the second shaft receiver is fixed in the same way, which will not be repeated.

In one embodiment, a sleeve may be fixed to the outer circumference of the first shaft 21, and a through hole may be defined in the sleeve. After the second pulling member 7 passes through the through hole and a head of the second pulling member 7 abuts against the sleeve, the second pulling member 7 is fixed to the first shaft 21.

In one embodiment, the outer diameter of the first shaft receiver 31 is equal to the outer diameter of the second shaft receiver 41. The first phalanx 3 and the second phalanx 4 thus rotate at the same angular velocity.

In one embodiment, a first accommodating groove and a second accommodating groove are respectively formed in the fixed portion 2 and the first phalanx 3. Two legs of the torsion spring 9 are respectively received in the first accommodating groove and the second accommodating groove, so that the two legs are respectively connected to the fixed member 2 and the first phalanx 3. The torsion spring 9 is arranged around the first shaft 21.

In one embodiment, the driving assembly further includes a first pulley 32 rotatably connected to the first shaft 21. The third pulling member 8 wraps around the first pulley 32, and two opposite ends of the third pulling member 8 respectively extend toward the fixed member 2 and the second phalanx 4. In the embodiment, the number of the pulling member 8 is one. One end of the pulling member 8 is connected to the actuator 1. The pulling member 8 is fixed to the second phalanx 4 after passing through the fixed member 2, being wound around the first pulley 32, and passing through the first phalanx 3. The first pulley 32 is rotatably coupled to the first shaft 21. The first pulley 32 can then support the third pulling member 8, and does not exert a pulling force on the third pulling member 8. The first pulley 32 defines an annular groove for facilitating positioning and guiding of the third pulling member 8.

In one embodiment, the second phalanx 4 includes a first mounting block 42 and a first post 43 fixed to the first mounting block 42. The third pulling member 8 is fixed to the first post 43. In the embodiment, the first mounting block 42 is fixed to the second phalanx 4, and the first post 43 is threadedly connected to the first mounting block 42 so as to facilitate adjustment of tension of the third pulling member 8.

In one embodiment, the second phalanx 4 further includes a second mounting block 44 and a second post 45 fixed to the second mounting block 44. The second pulling member 7 is fixed to the second post 45. In the embodiment, the second mounting block 44 is fixed to the second phalanx 4, and the second post 45 is threadedly connected to the second mounting block 44 so as to facilitate adjustment of tension of the second pulling member 7.

In one embodiment, the first post 43 and the second post 45 are both hollow. The third pulling member 8 passes through the first post 43 and has a head 46 abutting against one end of the first post 43, which prevents the third pulling member 8 from disengaging from the second phalanx 4. The second pulling member 7 passes through the second post 45 and has a head 46 abutting against one end of the second post 45, which prevents the second pulling member 7 from disengaging from the second phalanx 4. The first mounting block 42 and the second mounting block 44 are integrally formed together.

Embodiment 2

The driving assembly of the embodiment differs from the driving assembly of embodiment 1 in that: The fixed member 2 includes a shaft at one end, and the first phalanx 3 includes a shaft receiver at an end adjacent to the fixed member 2. The shaft is received in the shaft receiver to form the revolute joint 011. The first phalanx 3 includes a shaft at an opposite end. The second phalanx 4 includes a shat receiver at an end adjacent to the first phalanx 3. The shaft is received in the shaft receiver to form the revolute joint 012. One end of the first pulling member 6 is fixed to the shaft receiver of the first phalanx 3, and both ends of the second pulling member 7 are fixed to the shaft of the fixed member 2 and the shaft receiver of the second phalanx 4, respectively.

Embodiment 3

The driving assembly of the embodiment differs from the driving assembly of embodiment 1 in that: In addition to the first phalanx 3 and the second phalanx 4, the phalanxes further includes a third phalanx. The second pulling member 7 and the third pulling member 8 are both two in number. The second phalanx 4 has a third shaft at an end adjacent to the third phalanx. One end of the third phalanx has a third shaft receiver. The third shaft and the third shaft receiver form another second revolute joint 012. One end of one of the second pulling member 7 is fixed to the first shaft 21, and the other end is fixed to the second shaft receiver 41. The other second pulling member 7 has one end fixed to the second shaft 33 and an opposite end fixed to the third shaft receiver. One end of one of the pulling members 8 is fixed to the actuator 1 and the other end is fixed to the second phalanx 4. The other adaptive traction rope 8 has one end fixed to the actuator 1 and an opposite end fixed to the third phalanx. In other embodiments, the number of the phalanxes may be four or five. The second pulling 7 and the third pulling member 8 of the embodiment are arranged in a similar manner to that of embodiment 1, which will not be repeated here.

In one embodiment, the outer circumference of the first shaft 21 is provided with a first pulley 32 rotatably connected thereto, and the outer circumference of the second shaft 33 is provided with a third pulley rotatably connected thereto. An end of one of the third pulling members 8 is fixed to the actuator 1, and the third pulling member 8 is fixed to the second phalanx 4 after passing through the fixed member 2, wrapping around the first pulley 32 and passing through the first phalanx 3. One end of the other third pulling member 8 is fixed to the actuator 1, and the third pulling member is fixed to the third phalanx after pass through the fixed member 2, wrapping around the first pulley 32, passing through the first phalanx 3 and wrapping around the third pulley.

Figure 1:
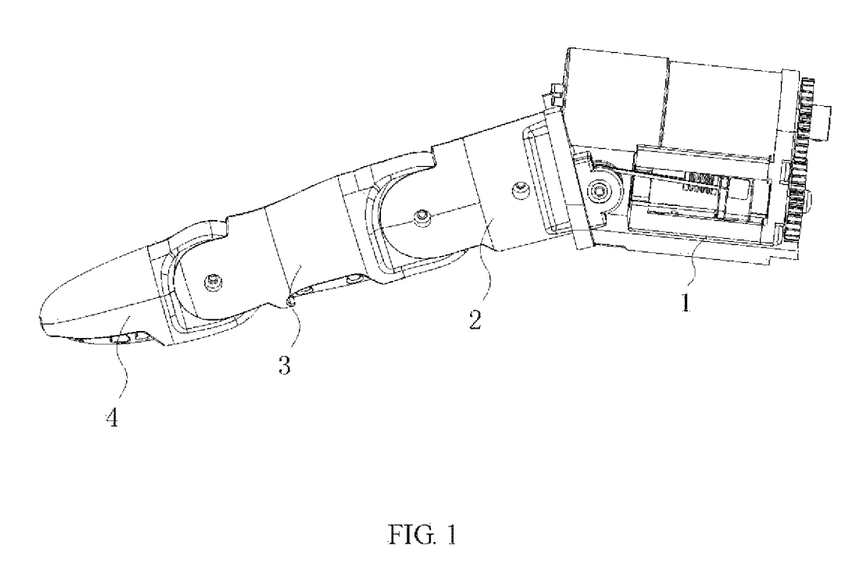
FIG. 1 is a schematic isometric view of a driving assembly of a robotic hand according to an embodiment.
Figure 2:
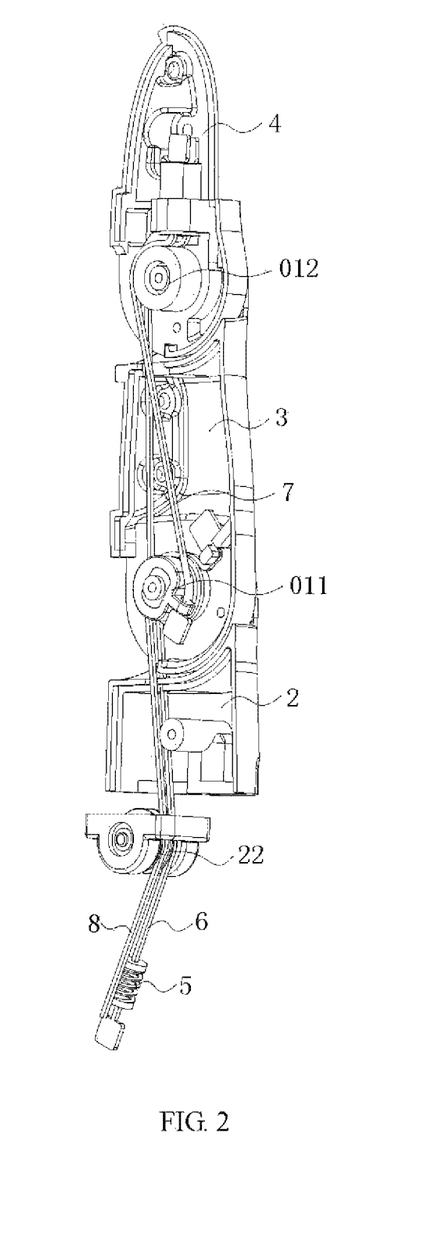
FIG. 2 is a schematic isometric view of the driving assembly of FIG. 1 with certain components omitted for clarity.
Figure 3:
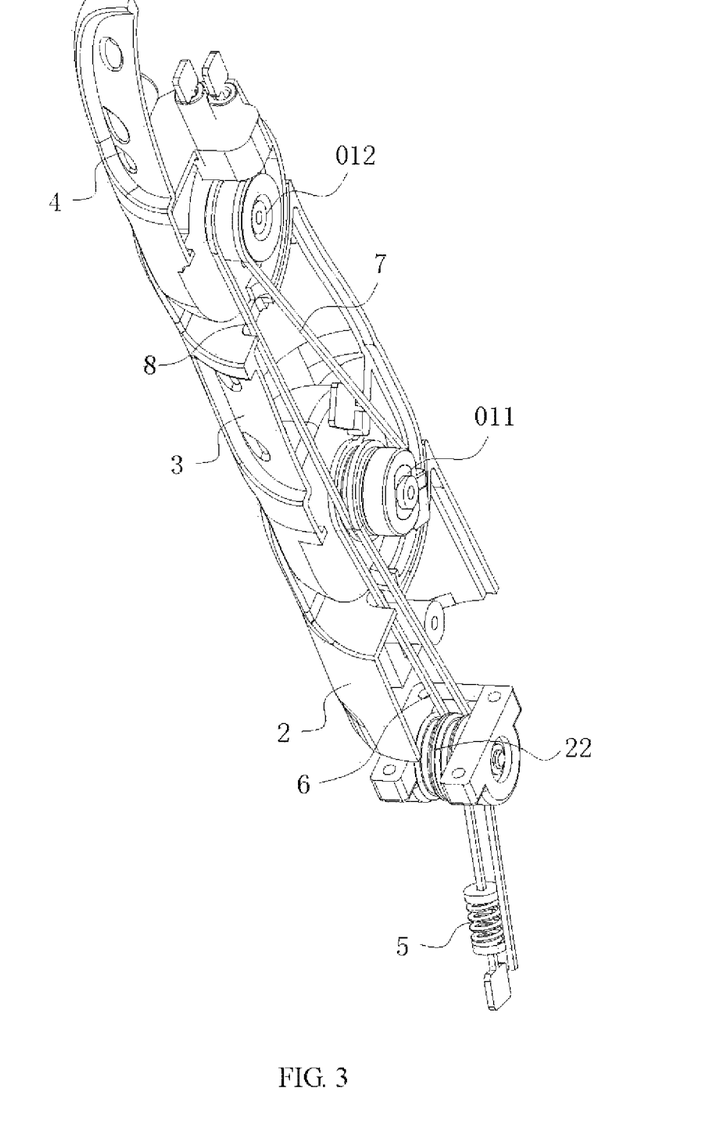
FIG. 3 is similar to FIG. 2, but viewed from a different perspective.
Figure 4:
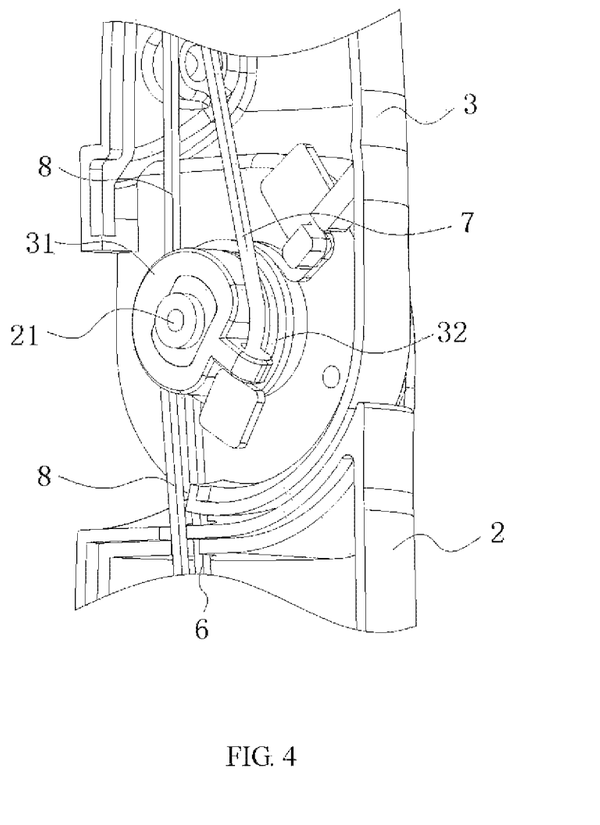
FIG. 4 is an enlarged view of an area of FIG. 2.
Figure 5:
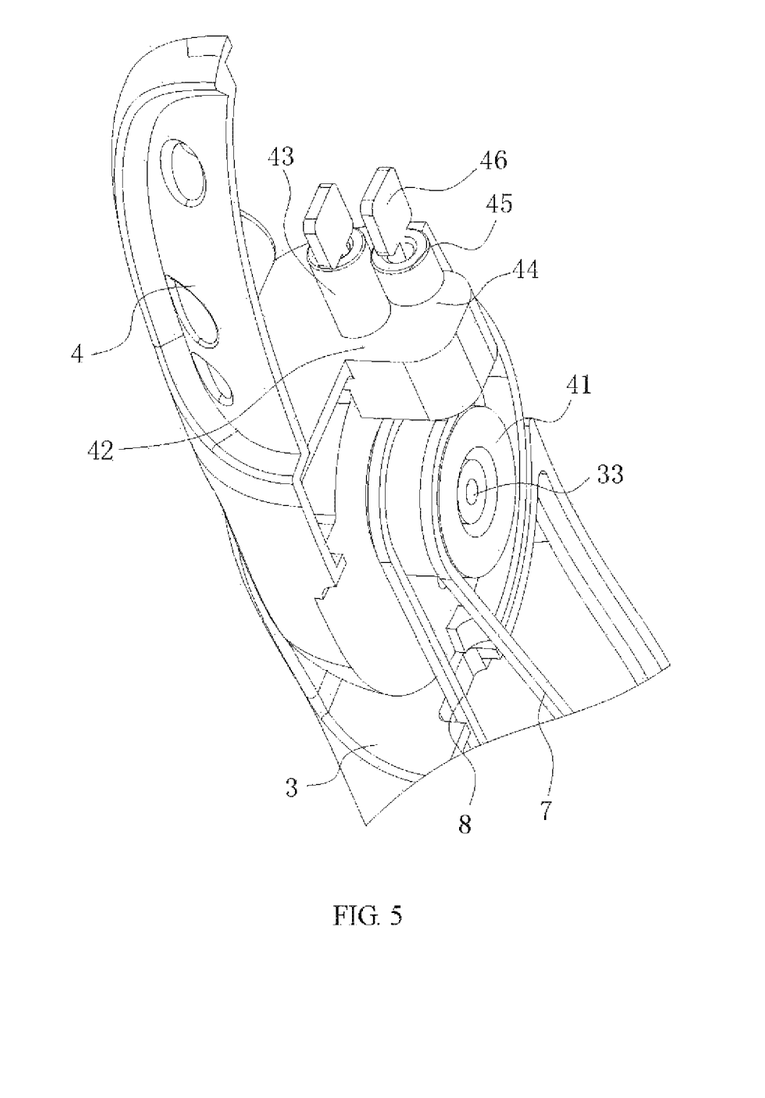
FIG. 5 is an enlarged view of an area of FIG. 3.

Referring to FIGS. 2 and 3, in one embodiment, the fixed member 2 is provided with a second pulley 22 rotatably connected thereto, and the first pulling member 6 and the third pulling member 8 wrap around the second pulley 22. The fixed member 2 can be a part of a finger of the robotic hand. The arrangement of the second pulley 22 can change the extending direction of the first pulling member 6 and the third pulling member 8, so that the first pulling member 6 and the third pulling member 8 can extend into the fixed member 2. Annular grooves for positioning and guiding the first pulling member 6 and the third pulling member 8 are defined in the second pulley 22.

Figure 6:
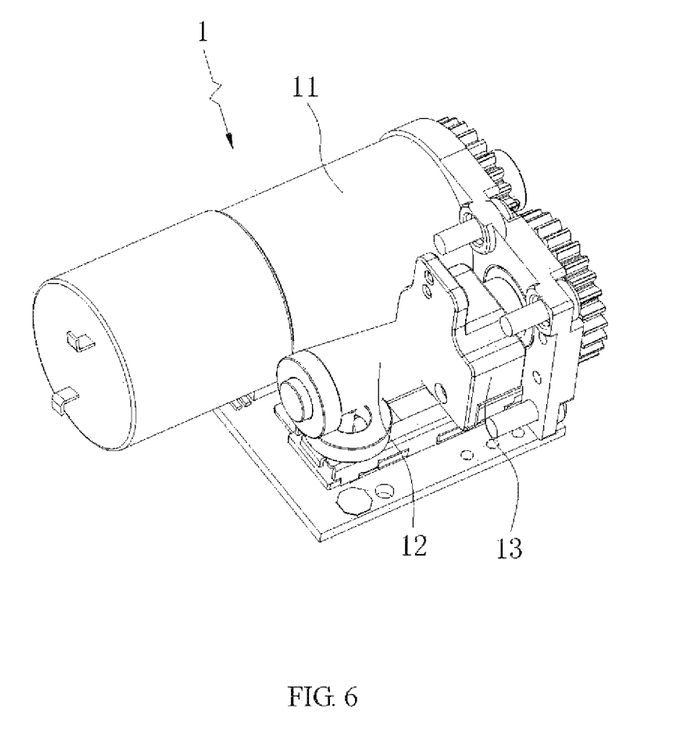
FIG. 6 is a schematic isometric view of an actuator of the driving assembly of FIG. 1.
Figure 7:
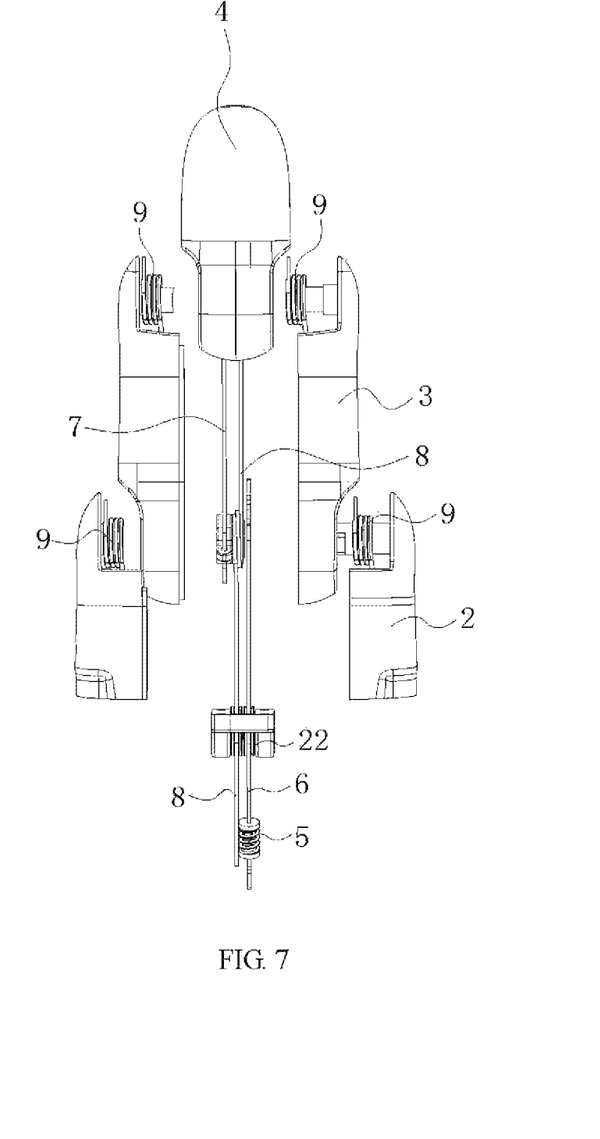
FIG. 7 is an exploded view of the driving assembly of FIG. 1.

Referring to FIG. 6, in one embodiment, the actuator 1 includes a motor 11 having an output shaft, a screw rod 12 fixed to the output shaft, and a nut 13 engaged with and slidable with respect to the screw rod 12. An end of the elastic member 5 and an end of the third pulling member 8 are fixed to the nut 13. When the output shaft of the motor 11 rotates, the screw rod 12 can be driven to rotate. The screw rod 12 then drives the nut 13 to move, thereby driving the first pulling member 6 connected to the elastic member 5, and the third pulling member 8 to move. The actuator 1 outputs only one degree of freedom through the nut 13, which drives the phalanxes to rotate. The actuator 1 has a simple structure, requires fewer components and a small space, and is lighter in weight. A speed reduction mechanism such as a gear assembly may be arranged between the motor 11 and the screw rod 12 to meet requirement in rotation speed.

In one embodiment, a robotic hand includes a driving assembly as described above.

With such configuration, the phalanxes are driven to rotate by using one actuator 70, which facilitates the compactness and reduction of weight and cost of the robotic hand. The torsion springs 9 facilitate smooth rotation of the phalanxes. When the middle phalanx bumps into the object to be grasped, the rotation of the middle phalanx is stopped. When the pulling force of the first pulling member 6 is greater than the deformation threshold of the elastic member 5, the elastic member 5 is stretched and elongated. The phalanx at the end is pulled by the third pulling member and continues to rotate until bumping into the object to be grasped, which achieves adaptive grasp.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A driving assembly of a robotic hand, the driving assembly comprising:
    an actuator;
    a fixed member;
    an elastic member comprising an end connected to the actuator;
    at least two phalanxes rotatably connected to each other through a first revolute joint, a first one of the at least two phalanxes being rotatably connected to the fixed member through a second revolute joint;
    torsion springs mounted to the first revolute joint and the second revolute joint, the torsion springs being configured to respectively apply a restoring force to the at least two phalanxes;
    a first pulling member comprising two opposite ends that are respectively fixed to the fixed member and the first revolute joint, the first pulling member being configured to pull the first one of the at least two phalanxes so as to rotate the first one of the at least two phalanxes with respect to the fixed member;
    a second pulling member comprising two opposite ends that are respectively fixed to the first revolute joint and the second revolute joint, the second pulling member being configured to pull a second one of the at least two phalanxes so as to rotate the second one of the at least two phalanxes with respect to the first one of the at least two phalanxes; and
    a third pulling member comprising two opposite ends that are respectively fixed to the actuator and the second one of the at least two phalanxes, the third pulling member being configured to pull a second one of the at least two phalanxes so as to rotate the second one of the at least two phalanxes with respect to the first one of the at least two phalanxes.

2. The driving assembly according to claim 1, wherein the fixed member comprises a first shaft at an end thereof, the first one of the at least two phalanxes comprises a first shaft receiver to rotatably receive the first shaft therein so as to form the first revolute joint, and a second shaft at an end thereof, the second one of the at least two phalanxes comprises a second shaft receiver to rotatably receive the second shaft therein so as to form the second revolute joint.

3. The driving assembly according to claim 2, wherein the first pulling member is fixed to the first shaft receiver, the two ends of the second pulling member are respectively fixed to the first shaft and the second shaft receiver.

4. The driving assembly according to claim 2, further comprising a first pulley rotatably connected to the first shaft, wherein the third pulling member wraps around the first pulley.

5. The driving assembly according to claim 2, wherein the second one of the at least two phalanxes comprises a first mounting block and a first post fixed to the first mounting block, and the third pulling member is fixed to the first post.

6. The driving assembly according to claim 5, wherein the first post is hollow, the third pulling member passes through the first post and comprises a head abutting against one end of the first post.

7. The driving assembly according to claim 2, wherein the second one of the at least two phalanxes comprises a second mounting block and a second post fixed to the second mounting block, and the second pulling member is fixed to the first post.

8. The driving assembly according to claim 1, further comprising a second pulley fixed to the fixed member, wherein the first pulling member and the third pulling member wrap around the second pulley.

9. The driving assembly according to claim 1, wherein the actuator comprises a motor comprising an output shaft, a screw rod fixed to the output shaft, and a nut engaged with and slidable with respect to the screw rod, an opposite end of the elastic member and one of the two ends of the third pulling member are fixed to the nut.

10. A robotic hand comprising a driving assembly, the driving assembly comprising:
an actuator;
a fixed member;
an elastic member comprising an end connected to the actuator;
at least two phalanxes rotatably connected to each other through a first revolute joint, a first one of the at least two phalanxes being rotatably connected to the fixed member through a second revolute joint;
torsion springs mounted to the first revolute joint and the second revolute joint, the torsion springs being configured to respectively apply a restoring force to the at least two phalanxes;
a first pulling member comprising two opposite ends that are respectively fixed to the fixed member and the first revolute joint, the first pulling member being configured to pull the first one of the at least two phalanxes so as to rotate the first one of the at least two phalanxes with respect to the fixed member;
a second pulling member comprising two opposite ends that are respectively fixed to the first revolute joint and the second revolute joint, the second pulling member being configured to pull a second one of the at least two phalanxes so as to rotate the second one of the at least two phalanxes with respect to the first one of the at least two phalanxes; and
a third pulling member comprising two opposite ends that are respectively fixed to the actuator and the second one of the at least two phalanxes, the third pulling member being configured to pull a second one of the at least two phalanxes so as to rotate the second one of the at least two phalanxes with respect to the first one of the at least two phalanxes.

* * * * *